United States Patent
Naito et al.

[11] Patent Number: 5,938,298
[45] Date of Patent: Aug. 17, 1999

[54] ANTISKID CONTROL DEVICE

[75] Inventors: Takeshi Naito, Anjo; Akitaka Nishio, Okazaki, both of Japan

[73] Assignee: Aisin Seiki Kabushiki Kaisha, Kariya, Japan

[21] Appl. No.: 08/749,238

[22] Filed: Nov. 15, 1996

[30] Foreign Application Priority Data

Nov. 17, 1995 [JP] Japan ................................. 7-300202

[51] Int. Cl.⁶ ..................................................... B60T 8/40
[52] U.S. Cl. .................................... 303/116.1; 303/156
[58] Field of Search ............................... 303/116.1, 155, 303/156, 157, 174

[56] References Cited

U.S. PATENT DOCUMENTS

| | | | |
|---|---|---|---|
| 4,569,560 | 2/1986 | Kubo .................................... | 303/116.1 |
| 4,912,641 | 3/1990 | Kuwana et al. ....................... | 303/156 |
| 5,197,788 | 3/1993 | Fennel et al. . | |
| 5,373,454 | 12/1994 | Kanda et al. ......................... | 303/116.1 |
| 5,393,132 | 2/1995 | Yogo et al. ........................... | 303/116.1 |

FOREIGN PATENT DOCUMENTS

| | | |
|---|---|---|
| 34 17 542 | 11/1984 | Germany . |
| 38 36 515 | 5/1989 | Germany . |
| 40 15 866 | 11/1991 | Germany . |
| 44 45 512 | 8/1995 | Germany . |
| 8-34329 | 6/1996 | Japan . |

*Primary Examiner*—Robert J. Oberleitner
*Assistant Examiner*—Robert A. Siconolfi
*Attorney, Agent, or Firm*—Burns, Doane, Swecker & Mathis, LLP

[57] ABSTRACT

The object to be achieved by the present invention is to improve accuracy in determining whether or not it is necessary to terminate antiskid control and to reduce the frequency with which the control is terminated. The solution proposed by the present invention is to stop operation of a hydraulic pump before it is determined that the antiskid control should be terminated during the duty pressure increase operation, whereby fluid pressure in a wheel brake can be raised to a level of fluid pressure in a master cylinder before it is determined that the antiskid control should be terminated, to continue the antiskid control as long as the wheel tends to be locked and to terminate the antiskid control when the wheel does not tend to be locked.

9 Claims, 8 Drawing Sheets

ANTISKID CONTROL DEVICE

FIELD OF THE INVENTION

The present invention relates to a braking control device, and more particularly to an antiskid control device designed to control pressure reduction and duty pressure increase.

BACKGROUND OF THE INVENTION

One kind of anti-skid control device is disclosed in U.S. Pat. No. 4,912,641. This device includes a wheel brake for applying a braking force to a wheel of a vehicle, a master cylinder for generating brake fluid pressure in response to the degree of depression of the brake pedal and for transmitting the generated brake fluid pressure to the wheel brake, a brake fluid pressure control valve interposed between the wheel brake and the master cylinder, a wheel speed detection device for detecting rotational speeds of the wheels, a start determining mechanism for determining whether or not it is necessary to start antiskid control in response to an output signal from the wheel speed detection device, and a pressure reduction determining device for determining whether or not it is necessary to reduce the brake fluid pressure applied to the wheel brake after the antiskid control start determining mechanism has determined that it is necessary to start the antiskid control.

This device further includes a brake fluid pressure control device which operates the brake fluid pressure control valve so that the brake fluid pressure in the wheel brake is reduced if the pressure reduction determining device has determined that it is necessary to reduce the pressure and operates the pressure control valve so that the duty brake fluid pressure in the wheel brake is increased periodically if the pressure reduction determining device has determined that it is not necessary to reduce the pressure. Also, the brake fluid pressure control device measures the period or duration of the duty pressure increase control so that the initial value of the duty pressure increase during the duty pressure increase control following the pressure reduction subsequently performed can be set to a large value if the period or the duration of the duty pressure increase control is longer than a reference value and can be set to a small value if the period or the duration is shorter.

This device also includes a hydraulic pump designed to operate and draw the brake fluid pressure from the wheel brake during the antiskid control to decrease the brake fluid pressure in the wheel brake, and a termination determining mechanism for determining that it is necessary to terminate the antiskid control when the duration of the duty pressure increase control is found equal to or larger than a predetermined duration. Furthermore, in this device, the operation of the hydraulic pump is stopped after it is determined that the antiskid control should be terminated by the termination determining device, that is when the antiskid control is terminated.

However, according to this device, the operation of the hydraulic pump is stopped when the antiskid control is terminated. That is, the hydraulic pump operates as long as the antiskid control continues so that the brake fluid pressure will not reach the level of the hydraulic pressure generated by the master cylinder (hereinafter referred to as M/C pressure) even when the duty pressure increase control is started.

Furthermore, it is determined that the antiskid control should be terminated when the duration of the duty pressure increase control is found equal to or longer than the predetermined duration. Therefore, even when the M/C pressure is close to a wheel locking pressure and the locking pressure is larger than a maximum brake fluid pressure of the wheel brake during the operation of the hydraulic pump, that is including when the control should not be terminated, the control will always be terminated when the duration of the duty pressure increase control exceeds the predetermined duration. More particularly, there is a possibility that the control will be terminated even when the control should not be terminated, which decreases the accuracy in determining whether or not such termination is necessary. Once the control is erroneously terminated, the control will have to be started and terminated repeatedly.

According to the device described in the foregoing, in order to prevent a pressure increase gradient from becoming too steep during the duty pressure increase control, the initial value for the duty pressure increase in the initial duty pressure increase control is set to a relatively small value. Thus, when the M/C pressure (i.e., the degree to which the brake pedal is depressed) is close to the wheel locking pressure (i.e., a small value), the pressure increase gradient during the initial duty pressure increase control becomes too gentle, which causes a delay in the pressure increase and gives rise to a possibility that vehicle deceleration may drop drastically. As described in the foregoing, in the case of the conventional device, unnecessary termination and start of the control has to be repeated, and so the duty pressure increase control has to be carried out based on a relatively small initial value which is reset each time the control is terminated. Consequently, the frequency of a sharp reduction in vehicle deceleration increases.

SUMMARY OF THE INVENTION

Thus, a need exists in the context of antiskid control devices to improve accuracy in determining whether or not the antiskid control should be terminated so that the frequency with which the control is terminated can be reduced.

Furthermore, a need exists in these systems to reduce the frequency with which vehicle deceleration drops drastically.

To address these needs, the antiskid control device of the present invention includes a wheel brake for applying braking force to a wheel of a vehicle, a master cylinder for generating brake fluid pressure in response to depression of a brake pedal and for transmitting the brake fluid pressure to the wheel brakes, a pressure control valve interposed between the wheel brake and the master cylinder to control the brake fluid pressure applied to the wheel brakes and a motor-operated pump for sucking the brake fluid in the wheel brake to decrease the brake fluid pressure in the wheel brake. The antiskid control device further comprises a wheel speed sensor for detecting the rotational speed of the wheel, start determining means for determining whether or not antiskid control should be started in response to an output signal from the wheel speed sensor, pump operating means for operating the motor-operated pump when the start determining means has determined that it is necessary to start the antiskid control, pressure reduction determining means for determining whether or not it is necessary to reduce the brake fluid pressure in the wheel brake in response to the output signal from the wheel speed sensor, and brake fluid pressure control means for controlling the pressure control valve so as to reduce the brake fluid pressure in the wheel brake when the pressure reduction determining means has determined that it is necessary to reduce the pressure and for controlling the pressure control valve so as to duty-increase the brake fluid pressure in the wheel brake when the pressure reduction determining means has determined that it is not necessary to reduce the pressure.

The antiskid control device also includes pressure increase duration measuring means for measuring a duration of duty pressure increase control, pump stopping means for stopping operation of the pump when the duration of the duty pressure increase control measured by the pressure increase duration measuring means has exceeded a first set time and termination determining means for determining that it is necessary to terminate the antiskid control when the duration of the duty pressure increase control measured by the pressure increase duration measuring means has become equal to a second set time which is longer than the first set time.

In this case, the first set time is preferably longer than the duration required to raise the brake fluid pressure in the wheel brake to the level of a locking pressure during the ordinary antiskid control, that is when the locking pressure is smaller than the maximum pressure applied to the wheel brake. In this way, the duty pressure increase control is switched to the pressure reduction control before the duration of the duty pressure increase control exceeds the first set time. As a result, there is no need to stop the pressure reduction pump during the ordinary antiskid control, and thus the pressure increase gradient can be prevented from becoming too steep.

By stopping the operation of the hydraulic pump before it is determined that the antiskid control should be terminated, the wheel brake fluid pressure can be raised to the level of a master cylinder fluid pressure (M/C pressure) before the antiskid control is terminated. Therefore, it is possible to continue the antiskid control as long as the wheels tend to be locked or discontinue the antiskid control as long as the wheels show no sign of locking. Thus, it is possible to accurately determine the necessity of such termination when the M/C pressure is close to the locking pressure, and the wheel locking pressure is larger than the maximum fluid pressure applied to the wheel brakes during the operation of the hydraulic pump. Hence, the frequency with which the control is terminated can be reduced.

In order to reduce the frequency with which the vehicle deceleration drops dramatically, the initial value of the duty ratio in the present duty pressure increase control is set to a large value if the period or the duration of the preceding duty pressure increase control is long and to a small value if the period or the duration is short.

When the M/C pressure is close to the locking pressure, the initial value of the duty ratio can be increased each time the duty pressure increase control is executed as long as the antiskid control continues. In other words, during the duty pressure increase control for the first time, the initial value of the duty ratio is set to a relatively small value, but, thereafter, the initial value is increased as the number of times of the duty pressure increase control increases. In accordance with the present invention, the frequency with which the antiskid control is terminated can be reduced, so that a learning control can be continued to a largest possible extent. As a result, the frequency with which vehicle deceleration drops drastically can be reduced.

According to another aspect of the present invention, an antiskid control device includes a wheel brake for applying braking force to a wheel of a vehicle, a master cylinder for generating brake fluid pressure in response to depression of a brake pedal and for transmitting the brake fluid pressure to the wheel brake, a pressure control valve interposed between the wheel brake and the master cylinder to control the brake fluid pressure applied to the wheel brakes, and a motor-operated pump for drawing the brake fluid in the wheel brake out of the wheel brake to decrease the brake fluid pressure in the wheel brake. A wheel speed sensor detects the rotational speed of the wheel and a start determining arrangement determines whether or not antiskid control should be started in response to an output signal from the wheel speed sensor. A pump operating device operates the motor-operated pump when the start determining arrangement has determined that it is necessary to start the antiskid control and an antiskid control termination device terminates the antiskid control. Additionally, A pump stopping mechanism stops the operation of the pump before the antiskid control is terminated by the antiskid control termination arrangement.

BRIEF DESCRIPTION OF THE DRAWING FIGURES

DETAILED DESCRIPTION OF PREFERRED EMBODIMENT

Figure 1:
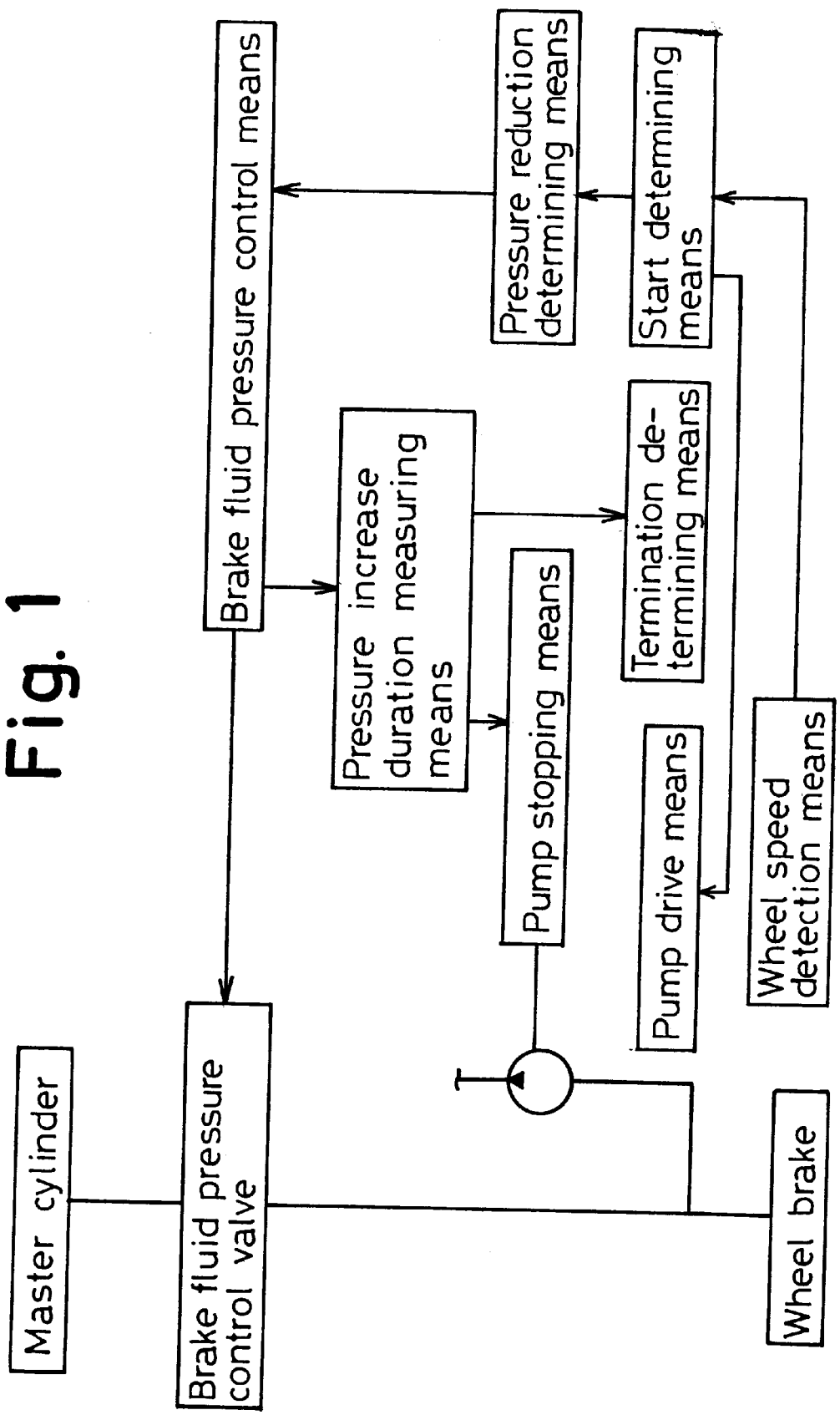
FIG. 1 is a block diagram illustration of the control device of the present invention.

With reference initially to FIG. 1, the antiskid control system of the present invention generally includes a master cylinder that is connected to individual wheel brakes, with a pressure control valve being interposed between the master cylinder and the individual wheel brakes. A brake fluid pressure control device is connected to the pressure control valve to effect operation of the control valve. Wheel speed sensors associated with each of the respective wheels are connected to a start determining means which in turn is connected to a pressure reduction determining means for inputting a signal to the brake fluid pressure control means for controlling operation of the pressure control valve. A pump is connected to a pump driving device, with the pump driving device being connected to the start determining means for controlling operation of the pump driving device. The pressure fluid control arrangement is connected to a pressure increase duration measuring mechanism which in turn is connected to both a pump stopping device as well as a termination determining arrangement.

Figure 2:
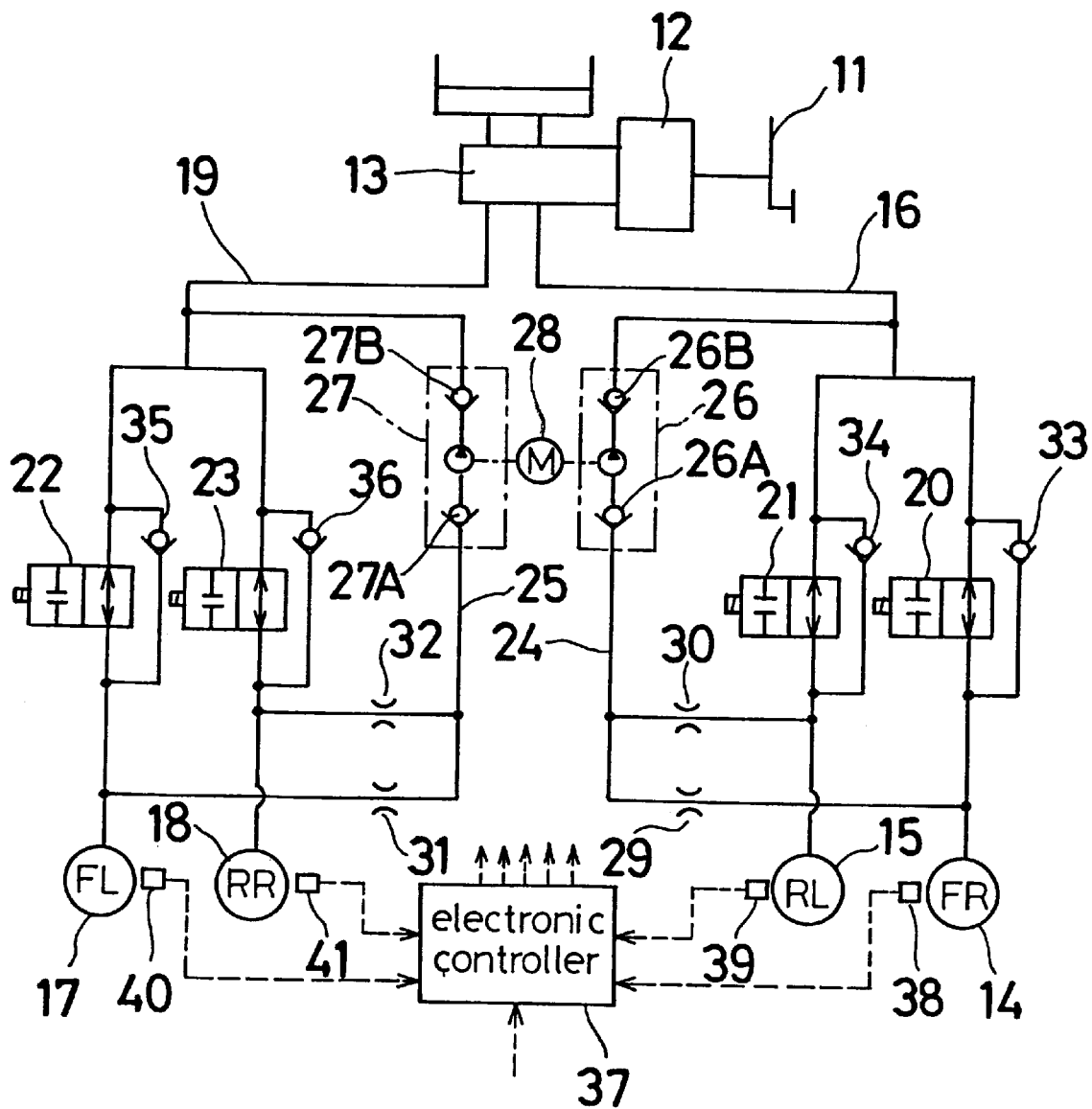
FIG. 2 is a schematic illustration of the braking system used in the antiskid control device according to the present invention.

As seen with reference to FIG. 2, the braking system includes a tandem master cylinder 13 that includes two pressure chambers. The brake operating force applied to the brake pedal 11 of an automated vehicle is doubled by a negative pressure type toggle joint 12 and is transmitted to the tandem type master cylinder 13. The right-front-wheel brake 14 and the left-rear-wheel brake 15 are hydraulically connected to one of the two pressure chambers within the tandem type master cylinder 13 through a first main passage 16. Furthermore, the left-front-wheel brake 17 and the right-rear-wheel brake 18 are hydraulically connected to the other of the two pressure chambers within the master cylinder 13 through a second passage 19.

A first permanently-open type electromagnetic valve (brake fluid pressure control valve) 20 for separating only the right-front-wheel brake 14 from the one pressure chamber of the master cylinder 13 and a second permanently-open type electromagnetic valve (brake fluid pressure control valve) 21 for separating only the left-rear-wheel brake 15 from the one pressure chamber of the master cylinder 13 are respectively provided in the middle of the first main passage 16. Similarly, a third permanently-open type electromagnetic valve (brake fluid pressure control valve) 22 for separating only the left-front-wheel brake 17 from the other pressure chamber of the master cylinder 13 and a fourth permanently-open type electromagnetic valve (brake fluid pressure control valve) 23 for separating only the right-rear-wheel brake 18 from the other pressure chamber of the master cylinder 13 are respectively provided in the middle of a second main passage 19.

The first main passage 16 is connected to a first flow passage 24 so that the brake fluid in the right-front-wheel brake 14 and the left-rear-wheel brake 15 can be returned to the main passage 16 at a point between the electromagnetic valves 20, 21 and the master cylinder 13 without passing through the electromagnetic valves 20 and 21. Similarly, the second main passage 19 is connected to a second flow passage 25 so that the brake fluid in the left-front-wheel brake 17 and the right-rear-wheel brake 18 can be returned to the main passage 19 at a point between the electromagnetic valves 22, 23 and the master cylinder 13 without passing through the electromagnetic valves 22 and 23.

The first flow passage 24 is provided with a first hydraulic pump 26 for sending pressurized brake fluid to the master cylinder 13 from the right-front-wheel brake 14 and the left-rear-wheel 15. Similarly, the second flow passage 25 is provided with a second hydraulic pump 27 for sending pressurized brake fluid to the master cylinder 13 from the left-front-wheel brake 17 and the right-rear-wheel brake 18. These two hydraulic pumps 26 and 27 are driven by a common motor 28. The hydraulic pump 26 is provided with an intake valve 26A and a discharge valve 26B, while the hydraulic pump 27 is provided with an intake valve 27A and a discharge valve 27B.

A first orifice 29 is provided between the right-front-wheel brake 14 and the intake valve 26A in the first flow passage 24. The first orifice 29 is designed to reduce or raise the pressure of the brake fluid in the right-front-wheel brake 14 in response to the operation or non-operation of the first electromagnetic valve 20 while the master cylinder 13 and the first hydraulic pump 26 are in operation. Furthermore, a second orifice 30 is provided between the left-rear-wheel brake 15 and the intake valve 26A in the first flow passage 24. The second orifice 30 is designed to reduce or raise the brake fluid pressure in the left-rear-wheel brake 15 responding to the operation or non-operation of the second electromagnetic valve 21 while the master cylinder 13 and the first hydraulic pump 26 are in operation.

A third orifice 31 is provided between the left-front-wheel brake 17 and the intake valve 27A in the second flow passage 25. The third orifice 31 is designed to reduce or raise the brake fluid pressure in the left-front-wheel brake 17 in response to the operation and non-operation of the third electromagnetic valve 22 while the master cylinder 13 and the second hydraulic pump 27 are in operation. Furthermore, a fourth orifice 32 is provided between the right-rear-wheel brake 18 and the intake valve 27A in the second flow passage 25. The fourth orifice 32 is designed to reduce or raise the brake fluid pressure in the right-rear-wheel brake 18 in response to the operation and non-operation of the fourth electromagnetic valve 23 while the master cylinder 13 and the second hydraulic pump 27 are in operation.

The first main passage 16 includes check valves 33 and 34 connected in parallel with the electromagnetic valves 20 and 21. The check valves 33 and 34 are designed to reduce the brake fluid pressures in the right-front-wheel brake 14 and the left-rear-wheel brake 15 to the level of the hydraulic pressure of one of the pressure chambers of the master cylinder 13 when the hydraulic pressure of one of the pressure chambers of the master cylinder 13 has dropped below the brake fluid pressures of the right-front-wheel brake 14 and the left-rear-wheel brake 15 due to causes such as the cease of operation of the master cylinder 13.

Similarly, the second main passage 19 includes check valves 35 and 36 connected in parallel with the electromagnetic valves 22 and 23. The check valves 35 and 36 are designed to reduce the brake fluid pressures in the left-front-wheel brake 17 and the right-rear-wheel brake 18 to the level of the hydraulic pressure applied to the other pressure chamber of the master cylinder 13 when the hydraulic pressure of the other pressure chamber of the master cylinder 13 has dropped below the brake fluid pressures in the left-front-wheel brake 17 and the right-rear-wheel brake 18 due to, for example, the cease of operation of the master cylinder 13 or the like.

As seen from FIG. 2, when the brake pedal 11 is depressed, the master cylinder 13 is actuated causing one of the pressure chambers of the cylinder 13 to supply brake fluid to the right-front-wheel brake 14, sequentially passing the first main passage 16 and the first electromagnetic valve 20, and to the left-rear-wheel brake 15, sequentially passing the first main passage 16 and the second electromagnetic valve 21. At the same time, the other pressure chamber of the master cylinder 13 supplies brake fluid to the left-front-wheel brake 17, sequentially passing the second main passage 19 and the third electromagnetic valve 22, and to the right-rear-wheel brake 18, sequentially passing the second main passage 19 and the fourth electromagnetic valve 23.

During the braking operation of a vehicle, the brake fluid pressures in the right-front-wheel brake 14, the left-rear-wheel brake 15, the left-front-wheel brake 17 and the right-rear-wheel 18 can be reduced or increased by operating or stopping the operation of the electromagnetic valves 20 through 23, after starting the motor 28 to actuate the hydraulic pumps 26 and 27. When the hydraulic pump 26 is actuated, it starts to supply pressurized brake fluid from its intake side to its discharge side, whereby the brake fluid in the right-front-wheel brake 14 flows into the intake of the hydraulic pump 26 through the orifice 29, and the brake fluid in the left-rear-wheel brake 15 flows into the intake of the hydraulic pump 26 through the orifice 30. The brake fluid flowing out from the right-front-wheel brake 14 and the left-rear-wheel brake 15 into the intake of the hydraulic pump 26 is returned to the main passage 16 at a point between the electromagnetic valves 20, 21 and the master cylinder 13 by the hydraulic pump 26 and further flows into the wheel brakes 14 and 15 by way of the electromagnetic valves 20 and 21. The sizes of the orifices 29 and 30 are so determined that the amount of brake fluid flowing out from the orifices 29 and 30 after being supplied from the wheel brakes 14 and 15 is smaller than the amount of brake fluid respectively flowing into the wheel brakes 14 and 15 by way of the electromagnetic valves 20 and 21. The brake fluid pressure in the wheel brake 14 can be reduced by actuating the electromagnetic valve 20 to close after starting the hydraulic pump 26, and the brake fluid pressure in the wheel brake 15 can also be reduced by actuating the electromagnetic valve 21 to close after starting the hydraulic pump 26. When the hydraulic pump 26 is in operation, the brake fluid pressure in the wheel brake 14 can be increased by actuating the electromagnetic valve 20 to open, and the brake fluid pressure in the wheel brake 15 can be increased by actuating the electromagnetic valve 21 to open. Furthermore, the brake fluid pressures, as the duty pressures, in the wheel brakes 14 and 15 can be separately increased (with a gentle gradient) by operating the electromagnetic valves 20 and 21 in the duty mode.

Similarly, the brake fluid pressures in the wheel brakes 17 and 18 can be separately reduced, increased and increased in the duty mode by a actuating the electromagnetic valves 22, 23 for operation, case of operation and operation in the duty mode respectively after starting the hydraulic pump 27.

The electromagnetic valves 20 through 23 and the motor 28 are connected to an electronic controller 37 and are thereby driven. The right-front wheel FR to be braked by the right-front-wheel brake 14, the left-rear wheel FL to be braked by the left-rear-wheel brake 15, the left-front wheel FL to be braked by the left-front-wheel brake 17, and the right-rear wheel RR to be braked by the right-rear-wheel brake 18 are respectively provided with wheel speed sensors (or wheel speed detection means) 38, 39, 40 and 41 which are respectively connected to the electronic controller 37.

Figure 3:
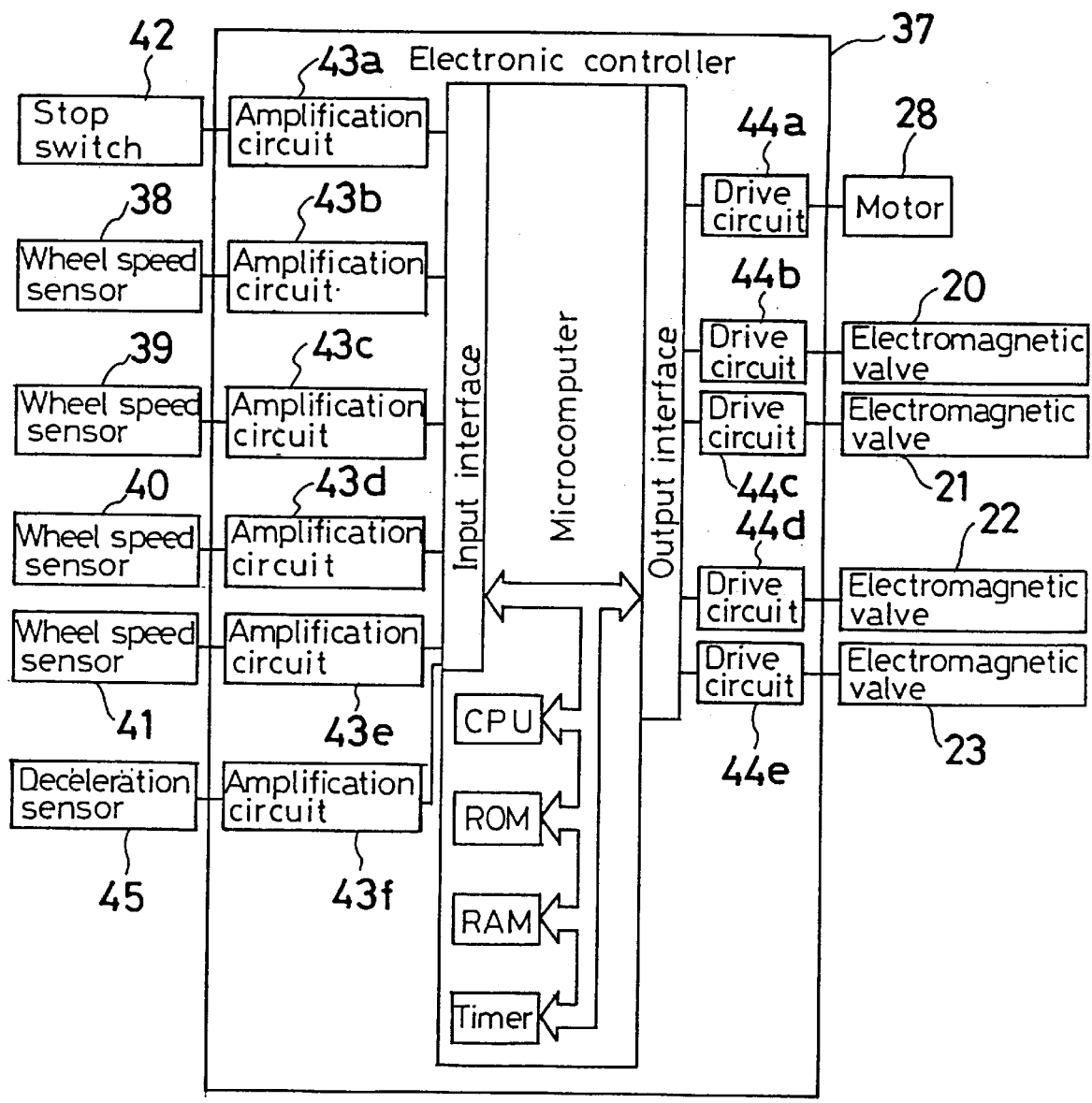
FIG. 3 is a block diagram illustrating details of the electronic controller shown in FIG. 2.

The electronic controller 37, as shown in FIG. 3, includes a microcomputer comprising a CPU, a ROM, a RAM, a timer, an input interface and an output interface which are connected with one another through a bus. The output signals from the stop switch 42, designed to be turned on when the brake pedal 11 is depressed, a deceleration sensor 45, and the wheel speed sensors 38 through 41 are input, through the input interface, to the CPU by way of amplification circuits 43a–43f.

Furthermore, the output interface outputs control signals to the motor 28 through the drive circuit 44a and drive signals to the electromagnetic valves 20 through 23 by way of the drive circuits 44b–44e. In the microcomputer, the ROM stores the program corresponding to the flowchart shown in FIG. 4, the CPU executes the program while the ignition switch (not shown) is closed, and the RAM temporarily stores the data of variables necessary for the execution of the program.

According to the present invention constructed as described in the foregoing, when the ignition switch is closed, the execution of the program corresponding to the flowchart is started. First, the microcomputer is initialized in step 101 shown in FIG. 4, thereby clearing various operational values, estimated vehicle body speed FSO corresponding to the vehicle speed, the wheel speeds VW of the individual wheels (right-front wheel FR, left-front wheel FL, right-rear wheel RR and left-rear wheel RL), etc. Then, in step 102, the wheel speeds VW of individual wheels are calculated in response to the output signals from the wheel speed sensors 38–41, and the program proceeds to step 103 where the accelerations DVW of the individual wheels are calculated based on these wheel speeds.

Then, the program proceeds to step 104 where it is determined whether or not the flag for indicating that the control of each wheel is in progress is 1 (indicating that the antiskid control is in progress). If not, in step 105 it is determined whether or not the conditions for starting the control are established based on the signals from the stop switch, the wheel speed VW, the wheel acceleration DVW and the estimated vehicle body speed VSO. If the control start conditions are not established, the program jumps directly to step 108. However, if it is determined that the control start conditions are established, the program proceeds to step 106 where the flag for the control in progress is set to 1, and the program proceeds to step 107 where the control mode of each wheel is set for one of the pressure reduction mode, the duty pressure increase mode and the pressure increase mode, based on the wheel speed VW, the wheel acceleration DVW and the estimated vehicle body speed VSO. Then, the program proceeds to step 108.

On the other hand, in step 104, when the flag for control in progress is 1, that is when it is found that the antiskid control is in progress, the determination for the termination of the control, which will be described later, will be made in step 110, and then it is determined whether or not the flag for control in progress is 0. If so, the program proceeds to step 108, and if not, the program proceeds to step 107.

In step 108, the duty pressure increase pointer, which will be described later, is set, and the program proceeds to step 109. The processing in steps 102 through step 111 are executed with respect to the individual wheels. When it is determined that the processing for all four wheels has been completed in step 109, the program proceeds to step 112 where the setting is made for simultaneous control of the wheels RR and RL for selecting low levels. Then, in step 113, the motor control signal, which will be described later, is output. In step 114, electromagnetic valve control signal is output. In step 115, the estimated vehicle body speed VSO is calculated and the program returns to step 102.

Figure 4:
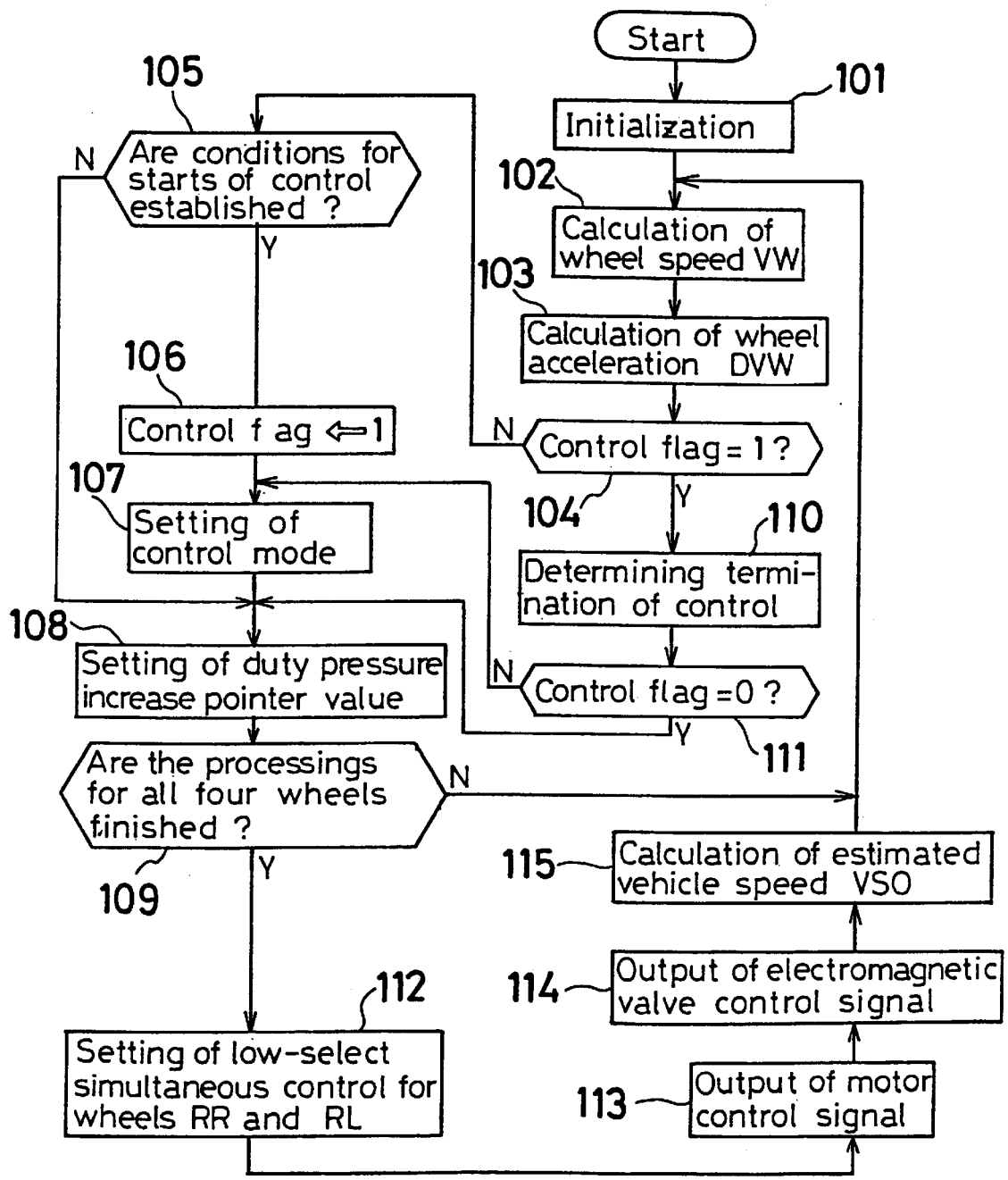
FIG. 4 is a flowchart illustrating the main routine of the antiskid control arrangement according to the present invention.

In step 112 of FIG. 4, it is determined whether each of the control modes of the wheels RR and RL set in step 107 is the pressure reduction mode or duty pressure increase mode or pressure increase mode, and, when any one of the control modes is the pressure reduction mode, both are treated as the pressure reduction mode. When both are not the pressure reduction mode, and one of them is the duty pressure increase mode, however, both are treated as the duty pressure increase mode.

In step 114, as shown in FIG. 4, with respect to the wheel; FR and FL, the control signal corresponding to the control mode set in step 107 (e.g., the control signal for continuous electrification in the case of pressure reduction mode, the control signal for continuous unelectrification in the case of the pressure increase mode, and the control signal for duty electrification in the case of duty pressure increase mode) is output to the electromagnetic valve corresponding to the wheel to be controlled (e.g. the electromagnetic valve 20 when the wheel to be controlled is the wheel FR). With respect to the wheels RR and RL, the control signal corresponding to the control mode set in step 112 (e.g., control signal for continuous electrification in the case of the pressure reduction mode, the control signal for continuous unelectrification in the case of pressure increase mode, and the control signal for duty electrification in the case of duty pressure increase mode) is output.

Figure 5:
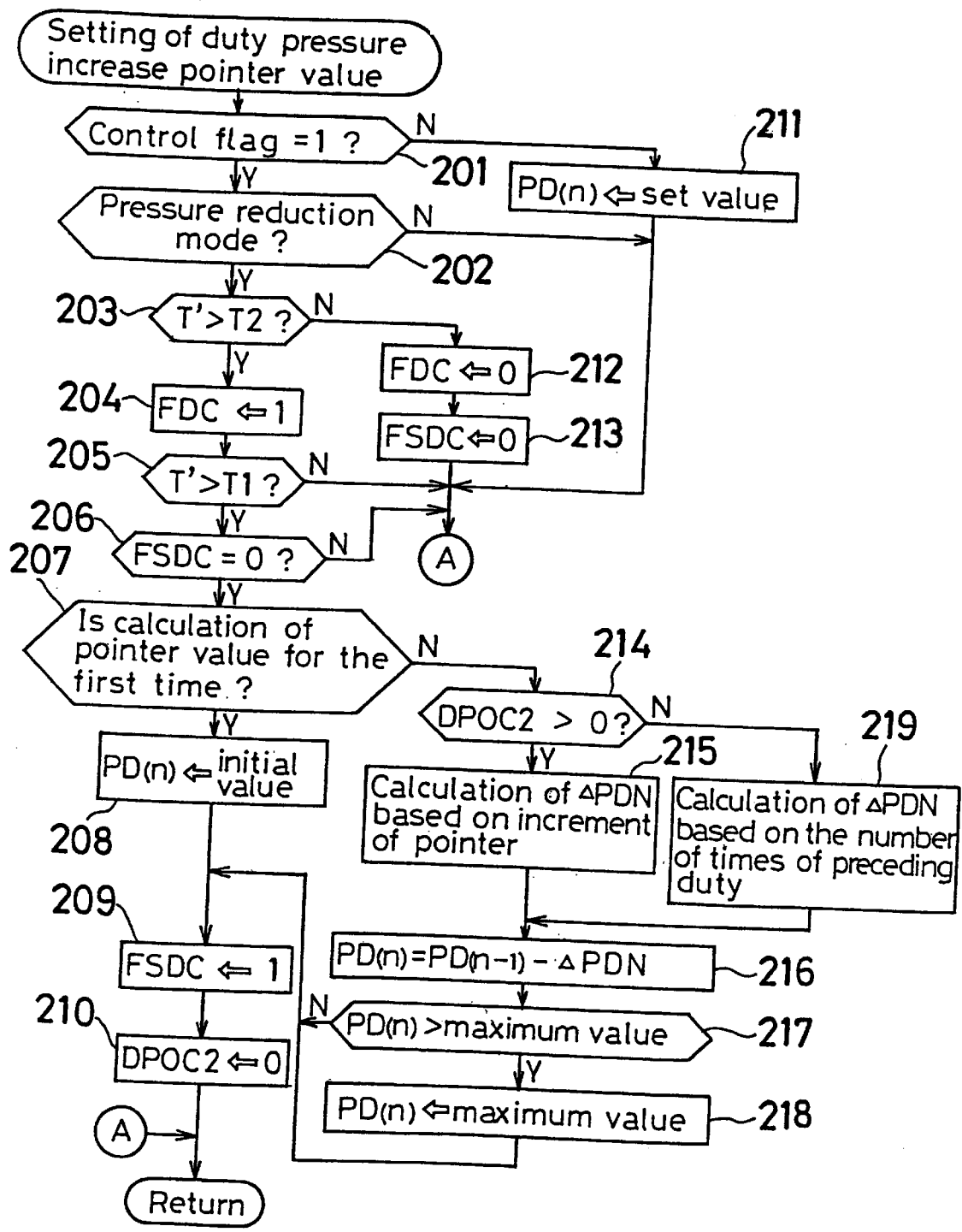
FIG. 5 is a flowchart illustrating the procedure for setting the duty pointer value.

FIG. 5 illustrates the procedure for setting the duty pressure increase pointer value to be executed in step 108 shown in FIG. 4. First, in step 201, it is determined whether or not the flag for the operation in progress is 1. If not, the program proceeds to step 211 where the duty pressure increase pointer value PD(n) (duty pressure increase) is updated to a predetermined set value (a relatively small value), and the program proceeds to the main routine of FIG. 4. When the flag for the operation in progress is 1, the program proceeds to step 202 where it is determined whether or not the mode is the pressure reduction mode. If it is not the pressure reduction mode (if it is the duty pressure increase mode), the program returns to the main routine shown in FIG. 4. In step 202, when the mode is the pressure reduction mode, the program proceeds to step 203 where it is determined whether or not the pressure reduction time T' is larger than a second set time T2 (e.g., 10 ms). If not, the program proceeds to step 212 where the flag FDC for the clearance of the counter for counting the number of times of execution of the duty pressure increase is reset to 0. Then, in step 213, the flag FSDC for the termination of the calculation of the duty pressure increase pointer value is reset to 0, and the program returns to the main routine shown in FIG. 4.

When it is determined in step 203 that the pressure reduction time T' is larger than the second predetermined time T2, the program proceeds to step 204 where the flag FDC for the clearance of the counter for counting the number of times of execution of the duty pressure increase is set to 1, and the program proceeds to step 205 where it is determined whether or not the pressure reduction time T' is larger than a first predetermined time T1 (e.g., 20 ms). When the pressure reduction time T' is equal to or shorter than the first predetermined time T1, the program returns to the main routine shown in FIG. 4. However, when the pressure reduction time T' is larger than the first predetermined time T1, the program proceeds to step 206 where it is determined whether or not the flag FSDC for the termination of the calculation of the duty pressure increase pointer value is 0. If not, the program returns to the main routine of FIG. 4. When the flag for the termination of the calculation of the duty pressure increase pointer value is 0, the program proceeds to step 207 where it is determined whether or not the calculation of the pointer value is for the first time. If so, the duty pressure increase pointer value PD(n) is updated to its initial value. In step 209, the flag FSDC for the termination of the calculation of the duty pressure increase pointer value is set to 1. In step 210, the counter DPOC2 for counting the increment of the duty pressure increase pointer value is reset to 0, and the program returns to the main routine of FIG. 4.

In step 207, when it is determined that the calculation of the pointer value is not the first-time calculation, it is determined in step 214 whether or not the count of the counter DPOC2 for counting the increment of the duty pressure increase pointer value PD(n) is larger than 0. If so, the program proceeds to stop 215 where the correction value $\Delta$ PDN is calculated based on the increment of the pointer value. If not, the program proceeds to step 219 where the correction value $\Delta$ PDN is calculated based on the number of times of execution of the preceding duty pressure increase (the number of times of execution of the preceding duty pressure increase in the duty pressure increase mode). Then, in step 216, the duty pressure increase pointer value PD(n) is obtained by subtracting the correction value $\Delta$ PDN from the value PD(n−1) of the preceding time, and the obtained value is updated. In step 217, it is determined whether or not this calculated value PD(n) is larger than the predetermined maximum value. If not, in step 218, the duty pressure increase pointer value PD(n) is updated to the maximum value. Then, the program returns to the main routine of FIG. 4 by way of the steps 209 and 210. In step 217, when it is found that the calculated value PD(n) is smaller than the maximum value, the program returns to the main routine of FIG. 4 by way of steps 209 and 210.

Figure 6:
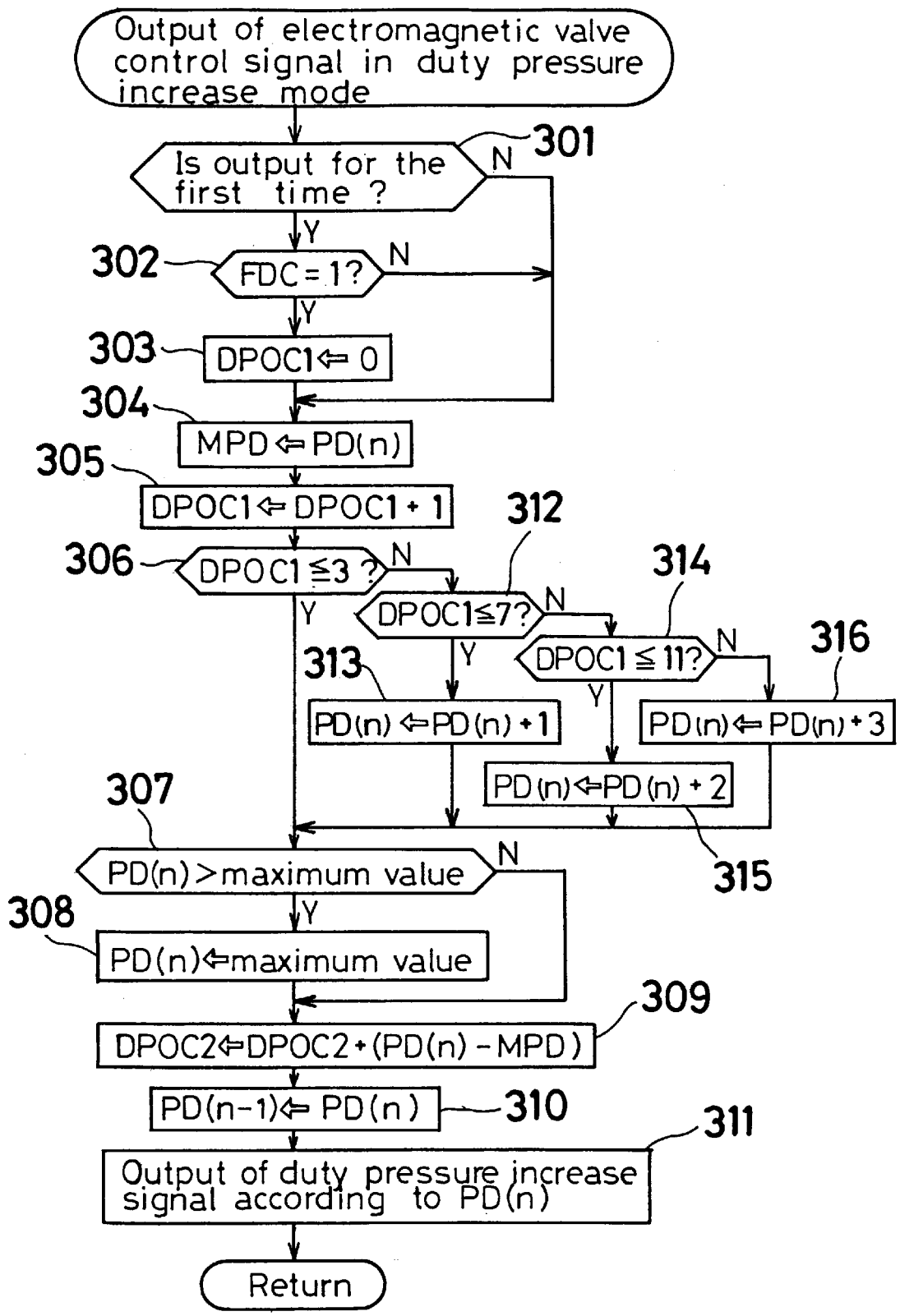
FIG. 6 is a flowchart illustrating the process for outputting the electromagnetic value control signal for the duty pressure increase.

FIG. 6 illustrates the procedure for outputting the electromagnetic valve control signal out of the electromagnetic valve control signals to be output in step 114. First, in step 301, it is determined whether or not the output is the first-time output. If not, the program proceeds to step 304. When the output is the first-time output, the program proceeds to step 302 where it is determined whether or not the flag FDC for the clearance of the counter for counting the number of times of execution of the duty pressure increase is 1. If not, the program proceeds to step 304. If yes, in step 303, the count of the duty pressure increase frequency counter DPOC1 (for counting the frequency of the duty pressure increase) is reset to 0, and the program proceeds to step 304. In step 304, the duty pressure increase pointer value PD(n), which has been set at the time of the preceding operation executed in the pressure reduction mode, is stored in memory MPD for the calculation of the increment. In the subsequent step 305, 1 is added to the count of the duty pressure increase frequency counter DPOC1. Then, in step 306, it is determined whether or not the count of the duty pressure increase execution frequency counter DPOC1 is 3 or less. If so, the program proceeds to step 307. If not, the program proceeds to step 312 where it is determined whether or not the count of the duty pressure increase execution frequency counter DPOC1 is 7 or less. In step 313, when the count of the duty pressure increase execution frequency counter DPOC1 is 7 or less, the duty pressure increase pointer value PD(n) is increased by 1 and updated to the increased value each time. However, in step 314, when the count of the duty pressure increase execution frequency counter is not 7 or less, it is determined whether or not the count of the duty pressure increase execution frequency counter DPOC1 is 11 or less. When the count of the duty pressure increase execution frequency counter DPOC1 is 11 or less, the duty pressure increase pointer value PD(n) is increased by 2 and updated to the increased value each time in step 315. However, when the count of the duty pressure increase execution frequency counter DPOC1 is larger than 11, the duty pressure increase pointer value PD(n) is increased by 3 and updated to the increased value each time in step 316. More particularly, the duty pressure increase pointer value PD(n) is not increased until the 3rd-time duty pressure increase output, but it is increased by 1 for each output from the 4th-time through 7th-time outputs, is increased by 2 for each output from the 8th-time through 11th-time outputs, and is increased by 3 for each output from the 12th-time output and on.

In step 307, it is determined whether or not the duty pressure increase pointer value PD(n) is larger than the maximum value. If not, the program proceeds to step 309. If the determination in step 307 is in the affirmative, the duty pressure increase pointer value PD(n) is updated to the maximum value. In step 309, the count of the duty pressure pointer value increment counter DPOC2 is updated to the value obtained by adding the difference obtained by subtracting MPD from PD(n). In step 310, the preceding-time value of PD(n−1) is updated to the present-time calculated value of PD(n). In step 311, the increased duty pressure corresponding to the present PD(n) value is output, and the program returns to the main routine of FIG. 4.

Figure 7:
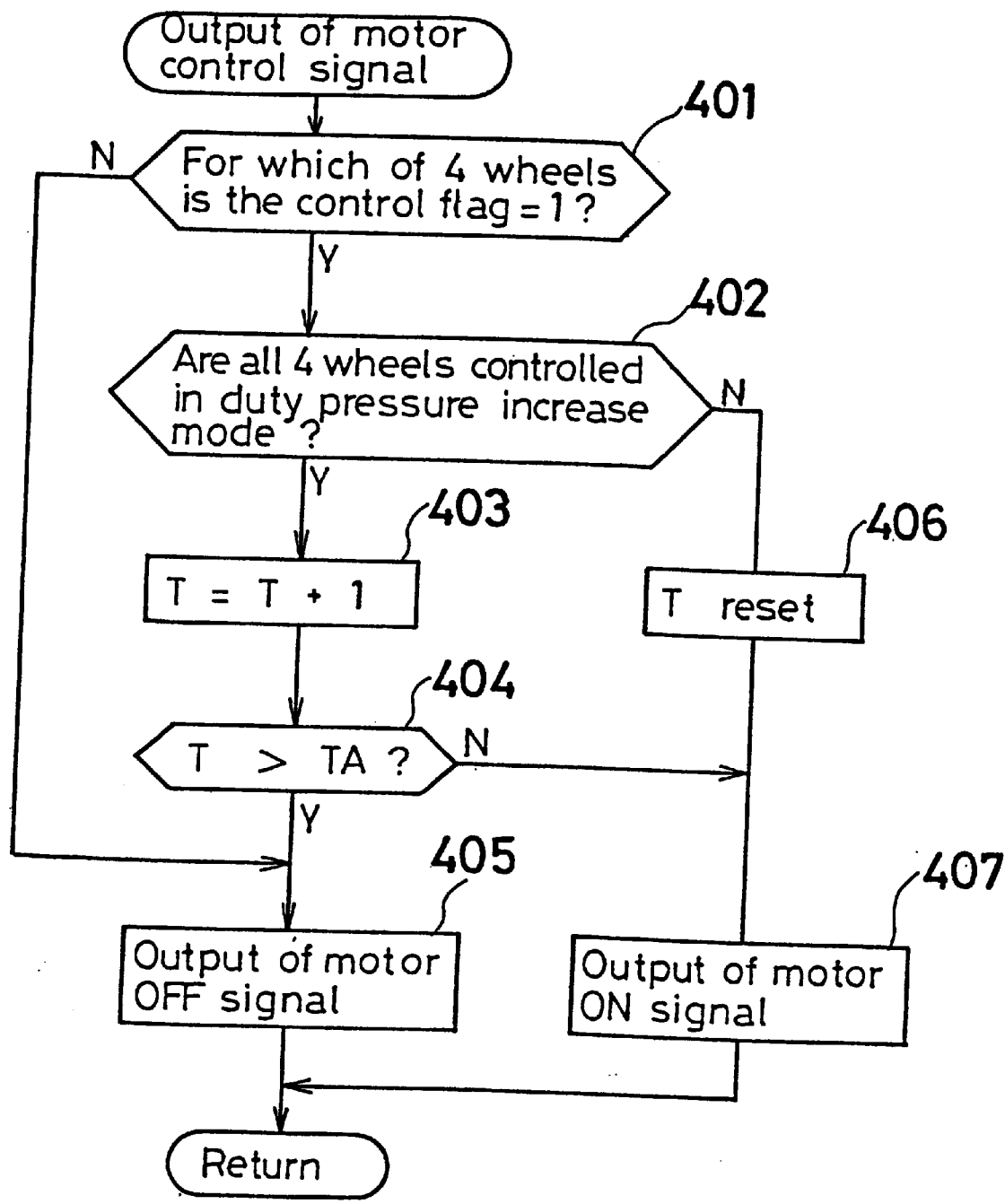
FIG. 7 is a flowchart illustrating the process for outputting the motor control signal.

FIG. 7 illustrates the procedure for outputting the motor control signal in step 113 of the routine shown in FIG. 4. First, in step 401, it is determined whether or not the flag for the control operation in progress for any one of the four wheels is 1. If so, the program proceeds to step 402. If not, the program jumps to step 405. In step 402, it is determined whether or not all the wheels (four wheels) are controlled in the duty pressure increase mode. If so, in step 403 the duty pressure increase mode duration T is increased for an increment. If not, in step 406 the duration T is reset to 0. In step 407, the program returns to the main routine of FIG. 4 with the motor 28 kept electrified. In step 403, the duration T of the duty pressure increase mode is measured, and the program proceeds to step 404 where it is determined whether or not the duration T is longer than the first set time TA. In this case, the first set time TA is set longer (to 500 ms in this case) than the duration of the duty pressure increase control (the time required from the switching to the duty pressure increase mode to the switching to pressure reduction mode) required for raising the wheel brake pressure to the level of the locking pressure at the time of the ordinary antiskid control (i.e., in the case where the locking pressure is smaller than the maximum wheel brake pressure while the hydraulic pump is in operation).

In step 404, when the duration T of the duty pressure increase mode is longer than the first set time TA, the motor 28 is unelectrified in step 405 to stop the operations of the hydraulic pumps 26 and 27, and the program returns to the main routine in FIG. 4. On the other hand, in step 404, when the duration T of the duty pressure increase mode is equal to or shorter than the first set time TA, the program proceeds to step 407 and then returns to the main routine of FIG. 4 with the motor 28 kept electrified. Furthermore, with the output of the motor control signal shown in FIG. 7, the motor 28 is electrified when any one of the flags for the control of the four wheels in progress has become 1, while the motor 28 is unelectrified when all the flags for the control of the four wheels in progress have become 0.

As described above, when the duration T of the duty pressure increase mode is longer than the first set time TA, the operations of the hydraulic pumps 26 and 27 are discontinued, so that the brake fluid pressures of all the wheels can be raised to the level of the M/C pressure. Further, the first set time TA, which serves as the threshold value to determine the timing for stopping the operation of the hydraulic pumps 26 and 27, is set longer than the duration of the duty pressure increase control for the ordinary antiskid control (i.e., when the locking pressure is smaller than the maximum wheel brake pressure while the hydraulic pump is in operation), so that the pressure increase gradient can be prevented from becoming too steep during the ordinary control without requiring that the operations of the hydraulic pumps 26 and 27 be stopped.

Figure 8:
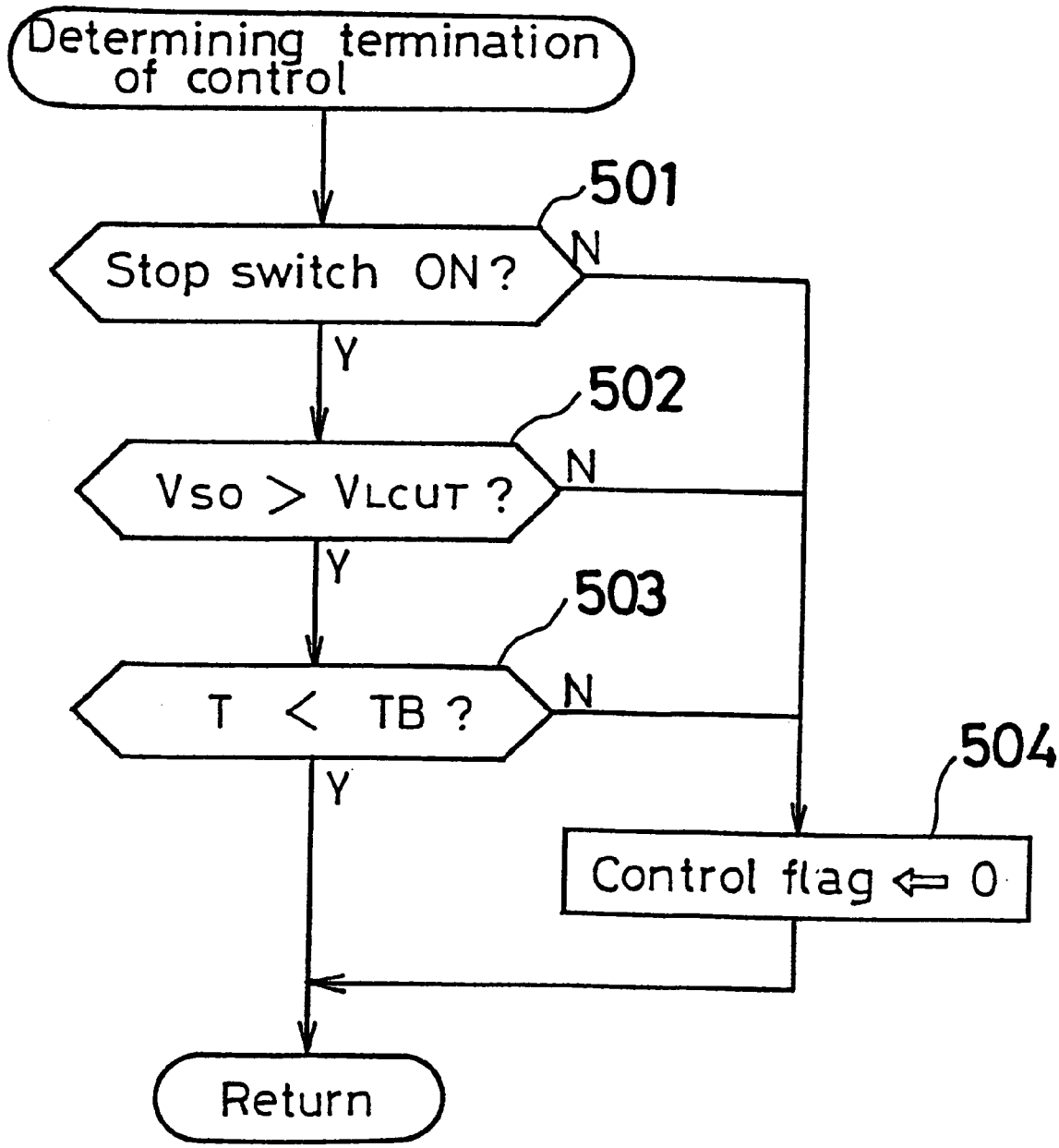
FIG. 8 is a flowchart illustrating the process for determining the necessity of the termination of the control.

FIG. 8 illustrates the procedure for determining that the control in step 110 is completed. First, in step 501, it is determined whether or not the stop switch 42 (see FIG. 2) is turned on. If so, the program proceeds to step 502. If it is determined in step 504 that the stop switch 42 is not on, the control flag is set to 0 (i.e., it is determined that the antiskid control should be terminated) to terminate the antiskid control, and the program returns to the main routine of FIG. 4. In step 502, it is determined whether or not the estimated vehicle body speed VSO calculated in step 115 of FIG. 4 is larger than the predetermined lower limit value of the vehicle speed. If so, the program proceeds to step 503. If not, in step 504 control flag is set to 0 to terminate the antiskid control and the program returns to the main routine of FIG. 4.

In step 503, it is determined whether or not the duration T of the duty pressure increase mode has become equal to the second set time TB. In this case, the second set time TB is determined by adding to the second set time TA the time required to raise the maximum wheel brake pressure during the operation of the hydraulic pump to the level of the M/C pressure (e.g., 1 s). In step 503, when the duration T of the duty pressure increase mode has become equal to the second set time TB, the program proceeds to step 504 where the control flag is set to 0 (i.e., the antiskid control should be terminated), and the program returns to the main routine of FIG. 4. In step 503, when the duration T of the duty pressure increase mode has not reached the second set time TB, the program returns to the main routine of FIG. 4 with the control continuing.

As seen from FIG. 7 and FIG. 8, by stopping the operations of the hydraulic pumps 26 and 27 before terminating the antiskid control, the wheel brake fluid pressure can be raised to the level of the fluid pressure of the master cylinder (M/C pressure) before the termination of the antiskid control is determined to be necessary. As a result, it becomes possible to continue the antiskid control as long as the wheels show the tendency of locking and to discontinue the antiskid control when the wheels do not show locking tendency. Thus, when the M/C pressure is near the locking pressure, and the locking pressure of the wheel is larger than the maximum fluid pressure of the wheel brake, it is possible to not only improve the accuracy in determining the termination of the control, but to also reduce the frequency of the termination of the control.

By stopping the operation of the hydraulic pump before the termination of the antiskid control is determined to be necessary, the fluid pressure of the wheel brake can be raised to the level of the fluid pressure of the master cylinder (M/C pressure) before the termination of the antiskid control is determined to be necessary. As a result, the antiskid control can be continued as long as the wheels show the tendency of locking, and the antiskid control can be terminated when the wheels do not show locking tendency. Thus, when the M/C pressure is near the locking pressure, and the locking pressure of the wheel is larger than the maximum fluid pressure of the wheel brake while the hydraulic pump is in operation, it is possible to improve the accuracy in determining the necessity of the termination and to also reduce the frequency of the termination of the control.

The initial value of the duty pressure increase for the present duty pressure increase control can be increased when the period or duration of the preceding duty pressure increase control is larger and can be decreased when the period of the preceding duty pressure increase control is smaller. Thus, when the M/C pressure is near the locking pressure, the initial value of the duty pressure increase can be increased each time the duty pressure increase control is executed as long as the antiskid control is continuing. More particularly, in the first-time duty pressure increase control, the initial value of the duty pressure increase is set to a relatively small value, but in the duty pressure increase control of the second time and subsequent times, the initial value of the duty pressure increase is increased as the number of times of execution of the control increases. The frequency of the termination of the antiskid control can be reduced, so that the learning control can be continued to a largest possible extent. As a result, the frequency with which vehicle speed drops drastically can be reduced.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An antiskid control device comprising:

a wheel brake for applying braking force to a wheel of a vehicle;

a master cylinder for generating brake fluid pressure in response to depression of a brake pedal and for transmitting the brake fluid pressure to said wheel brake;

a pressure control valve interposed between said wheel brake and said master cylinder to control the brake fluid pressure applied to said wheel brakes;

a motor-operated pump for drawing the brake fluid in said wheel brake out of the wheel brake to decrease the brake fluid pressure in said wheel brake;

a wheel speed sensor for detecting rotational speed of the wheel;

start determining means for determining whether or not antiskid control should be started in response to an output signal from said wheel speed sensor;

pump operating means for operating the motor-operated pump when said start determining means has determined that it is necessary to start the antiskid control;

pressure reduction determining means for determining whether of not it is necessary to reduce the brake fluid pressure in said wheel brake in response to the output signal from said wheel speed sensor;

brake fluid pressure control means for controlling said pressure control valve so as to reduce the brake fluid pressure in said wheel brake when said pressure reduction determining means has determined that it is necessary to reduce the pressure and for controlling said pressure control valve so as to duty-increase the brake fluid pressure in said wheel brake when said pressure reduction determining means has determined that it is not necessary to reduce the pressure;

pressure increase duration measuring means for measuring a duration of duty pressure increase control;

pump stopping means for stopping operation of the pump when the duration of the duty pressure increase control measured by said pressure increase duration measuring means has exceeded a first set time; and termination determining means for determining that it is necessary to terminate the antiskid control when the duration of the duty pressure increase control measured by said pressure increase duration measuring means has become equal to a second set time which is longer than said first set time.

2. An antiskid control device according to claim 1, wherein said brake fluid pressure control means stores a duration of a preceding duty pressure increase control and sets an initial value of a duty ratio in a present duty pressure increase control to a first value if the duration of the preceding duty pressure increase control is longer than a reference value and to a second value if the duration is shorter than the reference value.

3. An antiskid control device according to claim 2, wherein the first value is greater than the second value.

4. An antiskid device according to claim 1, including a plurality of wheel brakes for applying a braking force to respective wheels of a vehicle, and a plurality of pressure control valves each interposed between one of the wheel brakes and the master cylinder to control the brake fluid pressure applied to the respective wheel brakes.

5. An antiskid control device according to claim 3, including a plurality of wheel speed sensors which each detects the rotational speed of one of the wheels of the vehicle.

6. An antiskid control device comprising:

a wheel brake for applying braking force to a wheel of a vehicle;

a master cylinder for generating brake fluid pressure in response to depression of a brake pedal and for transmitting the brake fluid pressure to said wheel brake;

a pressure control valve interposed between said wheel brake and said master cylinder to control the brake fluid pressure applied to said wheel brakes;

a motor-operated pump for drawing the brake fluid in said wheel brake out of the wheel brake to decrease the brake fluid pressure in said wheel brake;

a wheel speed sensor for detecting rotational speed of the wheel;

start determining means for determining whether or not antiskid control should be started in response to an output signal from said wheel speed sensor;

pump operating means for operating the motor-operated pump when said start determining means has determined that it is necessary to start the antiskid control;

pressure reduction determining means for determining whether or not it is necessary to reduce the fluid brake pressure in the wheel brake;

brake fluid pressure control means for controlling said pressure control valve to reduce the brake fluid pressure in said wheel brake when said pressure reduction determining means determines that it is necessary to reduce the brake fluid pressure and for controlling said pressure control valve to duty-increase the brake fluid pressure in said wheel brake when said pressure reduction determining means determines that it is not necessary to reduce the pressure;

pressure increase duration measuring means for measuring a duration of duty pressure increase control;

antiskid control termination means for terminating the antiskid control; and pump stopping means for stopping operation of the pump before antiskid control is terminated by the antiskid control termination means and based on the duration of the duty pressure increase control measured by the pressure increase duration measuring means.

7. An antiskid control device according to claim 6, wherein said pump stopping means stops operation of the pump when the duration of the duty pressure increase control measured by the pressure increase duration measuring means exceeds a first time.

8. An antiskid control device according to claim 7, wherein said antiskid control termination means terminates the antiskid control based on the duration of the duty pressure increase control measured by the pressure increase duration measuring means.

9. An antiskid control device according to claim 6, wherein said antiskid control termination means terminates the antiskid control based on the duration of the duty pressure increase control measured by the pressure increase duration measuring means.

* * * * *